United States Patent [19]

Van Eenam

[11] 4,433,090

[45] Feb. 21, 1984

[54] VISCOSITY MODIFIERS FOR ACRYLAMIDE POLYMER

[75] Inventor: Donald N. Van Eenam, Des Peres, Mo.

[73] Assignee: Monsanto Company, St. Louis, Mo.

[21] Appl. No.: 502,830

[22] Filed: Jun. 9, 1983

[51] Int. Cl.$^3$ ............................................. C08F 2/38
[52] U.S. Cl. .................................. 524/295; 524/776; 526/213

[58] Field of Search ................ 524/295, 776; 526/213, 526/303.1

Primary Examiner—Paul R. Michl
Assistant Examiner—Alex H. Walker
Attorney, Agent, or Firm—Michael C. Schiffer; Paul D. Matukaitis; Arnold H. Cole

[57] ABSTRACT

An acrylamide polymer comprising acrylamide and a sufficient amount of cinnamic acid to substantially reduce the viscosity of the acrylamide polymer and solution.

9 Claims, No Drawings

VISCOSITY MODIFIERS FOR ACRYLAMIDE POLYMER

BACKGROUND OF THE INVENTION

1. Field of the Invention

The present invention relates to acrylamide polymer solutions and, more particularly, to a material which reduces the viscosity of acrylamide polymer solutions. Furthermore, the present invention relates to a process of preparing lower viscosity acrylamide polymer solutions using the viscosity reducing materials of the present invention and the use of these low viscosity grafted starch polymer solutions as dry strength additives for fibrous substrates such as paper.

2. Discussion of the Prior Art

Acrylamide polymers have been found useful as adhesives, coatings, and resins useful for improving the properties of paper. Acrylamide polymers can be applied as solutions, typically aqueous. The use of acrylamide polymer solutions has been hindered because of the generally high viscous nature of these solutions. Various procedures to reduce the viscosity of a acrylamide polymer solution have been utilized. One such method involves raising the temperature of the acrylamide solution. Another method is to reduce the overall percent solids of the acrylamide polymer in solution. Both of these alternatives are economically disadvantageous. Heating and maintaining the solution at an elevated temperature requires the use of complicated equipment. The use of more dilute solutions of acrylamide polymers is disadvantageous since it would require the application of larger amounts of solution to obtain the necessary amount of polymer application and would also require the transportation of more dilute solutions which is expensive.

SUMMARY OF THE INSTANT INVENTION

The present invention overcomes the above discussed disadvantages and other deficiencies of previous methods of reducing the viscosity of acrylamide polymer solutions through the use of a viscosity reducing material. The viscosity reducing material of the present invention is a cinnamic acid material which can be cinnamic acid or derivatives thereof, such as cinnamyl alcohol, various salts, including quaternary ammonium salts, and amines. This viscosity reducing material is polymerized with the acrylamide monomer in an amount sufficient so as to reduce the viscosity of the resulting acrylamide polymer solution. The specific amount of viscosity reducing material will be dependent upon the specific percent solids of the acrylamide polymer solution, and the desired viscosity. The greater the percent solids of the acrylamide polymer in solution, the greater the amount of viscosity reducing material required to achieve the desired viscosity. It has been found that the viscosity reducing material as defined above will effect a reduction in viscosity of acrylamide polymer solutions at all concentration gradients.

It has been found that the reduced viscosity acrylamide polymer solution prepared with the viscosity reducing materials of the present invention are particularly useful as dry strength resins for treating fibrous substrates such as paper.

DESCRIPTION OF THE PREFERRED EMBODIMENTS

The present invention generally relates to acrylamide polymer solutions wherein the viscosity is decreased through the use of a viscosity reducing material.

Acrylamide polymer is typically prepared by numerous well known free radical polymerization methods, e.g., radiation, free radical basic polymerization and mechanical fission. One particularly preferred method involves preparing a solution of the acrylamide monomers, adding thereto an appropriate free radical catalyst, and then carrying out the polymerization. Typical free radical catalysts which may be used are hydrogen peroxide, organic peroxides and hydroperoxides, persulfates, and ceric ion. An activator, which is typically a mild reducing agent can also be added along with the catalyst. A typical activator disclosed in the art is sodium formaldehyde sulfoxalate. All of these methods are well-known to those skilled in the art and require no further discussion herein.

As stated above, the typical method for producing acrylamide polymers of the present invention involves preparing a solution of the acrylamide monomer and appropriate catalyst with or without accelerator and then carrying out the polymerization. Of the various useful solvents, such as water, alcohol and ethers, the preferred solvent of the present invention is water.

The novel viscosity reducing material of the present invention is a cinnamic acid material. For the purpose of the present invention, the term "cinnamic acid material" shall be defined to include cinnamic acids and the derivatives of cinnamic acids, such as cinnamyl alcohol, the salts of cinnamic acid, including quaternary ammonium salts, amines and various substituted phenyl derivatives of cinnamic acid, with the sole proviso being that any such modification of the cinnamic acid not eliminate the basic ability of the material to be an effective viscosity reducing agent, the preferred materials being cinnamic acid, cinnamyl alcohol and the various salts of cinnamic acid.

The viscosity reducing material of the present invention is added prior or during the polymerization of the acrylamide monomer. The viscosity reducing material reacts with and becomes part of the acrylamide polymer.

It has been determined that the viscosity reducing material reduces the overall viscosity of the acrylamide polymer solution even when used in minimal amounts. Thus the amount of the viscosity reducing material used to prepare the acrylamide polymer solution will be dependent upon the desired final viscosity. The determination of the sufficient amount of viscosity reducing material to achieve the desired viscosity can be made by one skilled in the art by typical means, generally a sufficient amount of the viscosity reducing material of the present invention is added to significantly reduce the viscosity of the grafted starch polymer solution. A significant reduction in viscosity can be as low as a 25% reduction, preferably greater than 50% with reductions of over one hundredfold being obtainable in comparison to solutions containing the same grafted starch polymer absent the viscosity reducing material at the same solids content.

Furthermore, the amount of viscosity reducing material used to prepare acrylamide polymer solution will also be dependent upon the percent of solids in the solution. As stated above, the percent solids of the solution will also influence the amount of viscosity reducing material of the present invention used to achieve the desired viscosity. Typical prior art solutions have percent solids ranging between about 5 and about 15. While these types of solutions are generally of low viscosity, the additional use of the viscosity reducing material of the present invention will further reduce the overall viscosity. A solution for the purpose of the present invention will generally have solids ranging between five (5) and fifty (50) percent determined by drying 1 gram sample at one hundred twenty (120) degrees centigrade for one (1) hour.

It is preferable to limit the amount of the viscosity reducing material of the present invention below about 10 weight percent of the total weight of acrylamide polymer being prepared, more preferably, below about 5 weight percent and, even more preferably, between about 0.1 and about 2.0 weight percent.

Another feature of the present invention involves the preparation of a high solids solution from between 10 and 40 percent solids while incorporating therein the viscosity reducing material of the present invention and thus obtaining a final high solids solution having a desired viscosity within the range of between about 200 and about 15,000 and more, preferably between about 1000 and about 8000 centipoise. The solids content of the solution is determined as stated above while viscosities can be determined by either the Gardner or Brookfield methods. The amount of the viscosity reducing material of the present invention used to prepare this preferred acrylamide starch polymer solution will range between 0.5 weight percent and 10 weight percent of the acrylamide polymer, preferably between about 0.1 and about 2.0 weight percent.

As stated above, an acrylamide polymer prepared in accordance with the present invention has particular applicability in the use as a dry strength resin for fibrous substrates such as paper. It is sometimes desirable with dry strength resins to provide charged sites thereon to enhance the reaction between the polymer and the paper substrate. The types of materials useful to provide an anionic charge site to acrylamide polymers can be generally referred to as ethylenically unsaturated carboxylic acids such as acrylic, maleic, itaconic and methyacrylic acid. The acrylamide polymer can also be provided with a cationic charge site through the use of various materials such as diallyl diammonium chloride and N, N-dimethyl aminoethyl-methacrylate.

EXAMPLES 1-4

The following examples, 1 through 4 illustrate the reduction in viscosity of an acrylamide polymer solution through the use of the viscosity reducing material of the present invention. The acrylamide polymer solutions in Examples 1 through 4 were prepared by placing in an aqueous solution the quantities of the specific materials as listed below in Table 1 with 0.12 grams of ammonium persulfate catalyst into a 50 ml Erlemeyer flask which was equipped with a magnetic stirrer bar. The flask was stoppered after being nitrogen sparged and placed within a hot water bath maintained at a temperature between 70° and 80° C. for a period of about two hours.

Also provided in Table 1 are the solution viscosities in centipoise, as determined by the Brookfield method, for each example. As seen in Table 1, those examples which were not prepared using the viscosity reducing material of the present invention exhibited higher viscosities, typically greater than 20,000 centipoise (see Examples 1 and 2). The remaining examples exhibited lower viscosities through the use of such viscosity reducing materials as defined herein, in particular, sodium cinnamate.

TABLE 1

| EX. | ACRYLAMIDE MONOMER (GRAMS) | VISCOSITY REDUCING MATERIALS (GRAMS) | OTHER MATERIALS (GRAMS) | VISCOSITY (CENTIPOISE) |
| --- | --- | --- | --- | --- |
| 1 | 5.0 | — | — | >20,000 |
| 2 | 4.75 | — | Na Acrylate (0.25) | >20,000 |
| 3 | 4.75 | Na Cinnamate (0.25) | — | 500 |
| 4 | 4.5 | Na Cinnamate (0.25) | Styrene (0.25) | 350 |

PREPARATION OF TREATED PAPER

EXAMPLES A - B

The following examples illustrate the application of acrylamide polymers prepared in accordance with the present invention to paper stock.

Specifically, the paper stock was 50/50 bleached hardwood/softwood kraft at CSF 500 with 30 lbs/ton of alum at a ptt of 4.5. The sheet was formed in a pilot paper machine at 50 fr/min with a basis weight of 30 lbs/3000 sq. ft. tensile strips (used to conduct the dry strength testing) were cut cross the direction from the center of the sheet. The 4×1 inch strips were tested for dry strength at an extension speed of 1 inch/min. Examples A through C involve the application of the above prepared Examples 3 and 4, respectively, to the paper stock. In Table 2, below, the amount of the respective acrylamide polymer examples applied to the paper and the resulting dry strength is shown.

While the preferred embodiments have been described and illustrated, various modifications and substitutions may be made thereto within the scope of the present invention. Accordingly, it is to be understood that the present invention has been described by way of illustration and not limitation.

TABLE 2

| Ex. | EXAMPLE CORRESPONDING TABLE 1 | APPLICATION LBS/TON | Dry STRENGTH LBS/TON |
| --- | --- | --- | --- |
| A | 3 | 10 | 22.7 |
|   |   | 40 | 31.2 |
| B | 4 | 10 | 20.3 |

TABLE 2-continued

| Ex. | EXAMPLE CORRESPONDING TABLE 1 | APPLICATION LBS/TON | Dry STRENGTH LBS/TON |
|---|---|---|---|
| | | 40 | 29.5 |

What is claimed is:

1. An acrylamide polymer comprising acrylamide and a sufficient amount of cinnamic acid to substantially reduce the viscosity of the acrylamide polymer in solution.

2. The acrylamide polymer of claim 1 wherein said cinnamic acid is below about 10 weight percent of the total weight of the acrylamide polymer.

3. The acrylamide polymer of claim 1 wherein said cinnamic acid is below about 5 weight percent of the total weight of said acrylamide polymer.

4. The acrylamide polymer of claim 1 wherein said cinnamic acid is between about 0.1 and about 2 weight percent of total weight of said acrylamide polymer.

5. The acrylamide polymer of claim 1 wherein said acrylamide is in an aqueous solution.

6. The acrylamide polymer of claim 5 wherein said acrylamide ranges between about 10 and 40 percent of the solution.

7. The acrylamide polymer of claim 6 wherein said cinnamic acid ranges between 0.5 and 10 weight percent of the acrylamide polymer.

8. The acrylamide polymer of claim 6 wherein said cinnamic acid ranges between about 0.1 and about 2 weight percent of the acrylamide polymer.

9. An acrylamide polymer solution comprising acrylamide and a sufficient amount of cinnamic acid to substantially reduce the viscosity of said solution.

* * * * *